United States Patent Office 2,873,164
Patented Feb. 10, 1959

2,873,164

PROCESS OF BLEACHING POLYACRYLONITRILE TEXTILES WITH STRONG MINERAL ACID PRE-TREATMENT AND THEN ACIDIFIED SODIUM CHLORITE

Walter H. Hindle, Decatur, Ala., assignor to The Chemstrand Corporation, Decatur, Ala., a corporation of Delaware No Drawing. Application February 28, 1955
Serial No. 491,215

6 Claims. (Cl. 8—108)

This invention relates to a process for bleaching certain acrylic fibers, and more particularly it relates to a method for pre-treating fibers containing acrylonitrile and certain basic monomers in polymeric form with acids to improve the effect of bleaching such fibers.

It is well-known that polyacrylonitrile and copolymers of acrylonitrile and other mono-olefinic polymerizable monomers are excellent fiber-forming materials. The polyacrylonitrile and copolymers of more than 80 percent of acrylonitrile and up to 20 percent of other polymerizable monomers produce fibers with superior tensile properties, desirable elongation, and excellent stability under a wide range of physical and chemical conditions. However, these polymers are subject to inherent disabilities which greatly restrict their utility in the fabrication of general purpose fibers. For example, the fibers are not susceptible to bleaching by the processes known to the prior art to a white which is suitable for many fabrication purposes.

The dye-receptivity of acrylonitrile polymers has been greatly improved by utilizing as the comonomer certain basic compounds particularly heterocyclic compounds containing a tertiary nitrogen in the ring and substituted with a polymerizable alkenyl group. Still further improvements in dye-receptivity and other properties of acrylonitrile fibers have been effected by blending polymers or copolymers of acrylonitrile containing at least 80 percent of acrylonitrile in polymeric form with a second copolymer containing at least 30 percent of a basic monomer which is preferably a heterocyclic compound containing a tertiary nitrogen atom in the ring and a polymerizable alkenyl group substituted thereon. These blends may have as a principle polymer from 70 to 98 percent of a copolymer of 80 or more percent acrylonitrile and minor proportions of monomers copolymerizable therewith. The other blend constituent is a polymer of 30 or more percent of the basic monomer and up to 70 percent of another copolymerizable monomer. The two compounds of the blended copolymers are proportioned so as to provide from two to ten percent of the basic monomer in polymerized form in the final blend. Suitable basic monomers are the unsaturated and alkyl-substituted unsaturated imidazoles, benzimidazoles, imidazolines, oxazoles, benzoxazoles, benzothiazoles, pyridazines, pyrimidines, pyrazines, pyrazoles, pyrroles, triazines, quinolines, pyridines, thiazoles, and lactams. Suitable examples of monomers of the above enumerated types are given in U. S. Patent 2,643,990. Preferred basic monomers are the unsaturated and alkyl-substituted unsaturated pyridines and imidazoles.

The monomers for copolymerization with acrylonitrile to form the principle polymer and for copolymerization with the basic monomer to form the blending polymer can be any of the well-known monomers which are copolymerizable with acrylonitrile or the basic monomer. Among the useful monomers for copolymerization with acrylonitrile to form the principle polymer may be mentioned vinyl acetate and other vinyl esters of mono-carboxylic acids having up to four carbon atoms, methylmethacrylate, and other alkyl methacrylates having up to four carbon atoms in the alkyl radical, methacrylate and other alkyl acrylates having up to four carbon atoms in the alkyl group, dimethylfumarate and other dialkyl fumarates having up to four carbon atoms in the alkyl groups, dimethyl maleate and other dialkyl maleates having up to four carbon atoms in the alkyl groups, styrene, alpha-methylstyrene and other vinyl or isopropenyl-substituted aromatic hydrocarbons, vinylchloroacetate and other vinyl esters of the halo-substituted acetic acids, vinylidene chloride, vinyl chloride and methacrylonitrile. Useful monomers for polymerization with the basic monomer to form the blending polymer are styrene, alpha-methylstyrene, vinyl chloride, vinylidene chloride, vinyl acetate, acrylonitrile, methacrylonitrile, acrylic acid, methacrylic acid, the alkyl acrylates, the alkyl methacrylates, vinyl ethers, alkyl crotonates, the alkyl maleates, and the alkyl fumarates. Since the copolymers of the basic monomers with acrylonitrile have good thermal stability and solvent resistance, these copolymers are usually preferred for the incorporation of the basic monomer in the polymer blend.

The present invention is concerned with improving the bleaching of both blends and copolymers which are comprised of from two to ten percent of N-heterocyclic monomer of the types described above and at least 80 percent of acrylonitrile both in polymeric form, and for brevity throughout the remainder of this specification and the appealed claims the terms "polymeric fibers containing at least 80 percent by weight of acrylonitrile and from two to ten percent of N-heterocyclic monomer in polymeric form" will be used to designate generically the fibers made from any of the copolymers or blends mentioned above.

Although as previously mentioned, incorporation of the dye-receptive monomers has enabled the production of fibers having greatly improved dye-receptivity, it has also resulted in the production of acrylic fibers which are more difficult to bleach to an acceptable white. Acrylic fibers which may be bleached to white, and which will retain the white color throughout extensive cleaning and use, are required by the textile industry for many purposes. Among these may be mentioned knitted goods such as sweaters, undergarments, knit dresses, and gloves, and woven materials applicable to the uses of fabrics in general.

Methods which have been proposed for bleaching other types of acrylic fibers, such as polyacrylonitrile fibers, have not been successful when applied to those acrylic fibers containing at least 80 percent by weight of acrylonitrile in polymeric form and from two to ten percent of N-heterocyclic monomer in polymeric form. They have been unsuccessful in that acceptable shades of white have not been produced upon bleaching these fibers by such processes known to the prior art as those of bleaching with aqueous solutions of hydrogen peroxide, hypochlorous acid, or calcium or sodium chlorite.

Moreover, the sensitivity to light energy which causes progressive darkening of acrylic fibers has been found to be greater and offer more trouble in the case of acrylic fibers containing at least 80 percent by weight of acrylonitrile and from two to ten percent of N-heterocyclic monomer in polymeric form.

It is, accordingly, the primary object of this invention to provide a method of bleaching acrylic fibers containing at least 80 percent by weight of acrylonitrile and from two to ten percent of N-heterocyclic monomer in polymeric form which results in whiter fibers after the bleaching process has been completed. Another object of this invention is to provide a method of bleaching such fibers which improves the light sensitivity characteristics of the fibers so bleached. Other objects of the invention will become apparent from the description hereinafter.

I have now discovered that the above objects can be accomplished by a method of bleaching polymeric fibers containing at least 80 percent by weight of acrylonitrile and from two to ten percent of N-heterocyclic monomer in polymeric form which comprises treating such fibers with a 0.05 to 0.5 percent by weight aqueous solution of a strong mineral acid and thereafter treating the said fibers with an aqueous solution of sodium chlorite amounting to from 2.5 to 6.0 percent sodium chlorite based on the weight of fibers treated at a temperature of from about 140° to 180° F. until no further bleaching occurs. Suitable acids for use in the first treating step of the process of this invention include sulfuric acid, nitric acid, hydrochloric acid, phosphoric acid, and pyrophosphoric acid.

The concentration of acid employed in my process may range from 0.05 to 0.5 percent by weight. For optimum results I prefer to employ from about 0.075 to about 0.4 percent by weight of acid in aqueous solution. I have found, however, that if acid concentrations below about 0.05 percent by weight are employed a commercially desirable white does not result from the subsequent second step of the bleaching process. For example, treatment in the first step with an aqueous solution of sulphuric acid of a concentration of 0.025 percent by weight results in an insufficient and unsatisfactory white upon subsequent sodium chlorite bleaching in the second step.

Optimum results are obtained in the first treating step at temperatures near the boiling point, but satisfactory results are obtained at all temperatures within the range of about 185° to 212° F. I have further found that the first acid treating step of my process can be carried out for a period of from about 15 to about 40 minutes. I prefer to carry out the first treating step of my process for from about 20 to about 30 minutes.

In carrying out my process for bleaching acrylic fibers, it is not necessary that the first treatment step be immediately succeeded by the second or bleaching step in the process. However, it is more convenient and economical to carry out the process in this manner, and this is therefore the preferred manner. Neither is it necessary to wash or remove excess acid treating solution after the termination of the first step before carrying out the succeeding steps in the process. I have found that optimum results are obtained in the most economical manner by making up the first treating composition of an aqueous acid solution of the concentrations specified and heating the treating bath to from 185° to 212° F. The goods in the form of fibers, yarns, or fabrics may be entered into the bath cold and the bath subsequently heated or, preferably, after the bath has approached 185° F. the goods may be entered and held therein for a period of between about 15 and 40 minutes. At the end of the first treating period, the acid treating bath can be dropped or decanted from the treating vessel and the subsequent or bleaching step can be carried out immediately and in the same container or vessel. This step consists of treating the said acrylic fibers in the form of fibers, yarns, or fabrics with an aqueous solution of sodium chlorite containing from 2.5 to 6.0 percent sodium chlorite based on the weight of the fibers treated at a temperature of from about 140° to 180° F. until the fibers are bleached substantially white or until no further bleaching occurs. It is apparent that the first acid treating step and the subsequent sodium chlorite treating step may be carried out in separate vessels if desired.

The first step of my process has been referred to as the acid treating step and the second or subsequent step as the bleaching step, since in the course of carrying out my process there is little or no apparent whitening of the acrylic fibers treated as a result of the first step alone. All or nearly all the detectable color change takes place during the course of the second or sodium chlorite treating step. The differences in the final color of the fibers subjected to sodium chlorite bleaching alone and those treated fully in accordance with my process is very striking, however. This leads to the conclusion that the acid treating first step has a distinct effect upon the acrylic fibers treated, but the mode of action of this treating step is not fully understood at present.

Moreover, I have found that the contrast between the light sensitivities of acrylic fibers bleached by sodium chlorite bleaching alone and in accordance with my new process is even more pronounced. The degradation of acrylic fibers treated in accordance with my process to a yellow or cream shade rather than a true white is both long-delayed and substantially diminished over the same effects of light energy on acrylic fibers not treated by my process. Thus, my new process possesses many advantages over the bleaching processes of the prior art.

The following specific examples, which illustrate but do not limit the invention and in which parts, proportions, and percentages are by weight unless otherwise specified, illustrate preferred modes of operating in accordance with the principles of this invention:

The tests for color indicative of approaching whiteness used throughout the examples consist of measurements of brightness, purity, and dominant wavelength as calculated from the tristimulus values determined on a General Electric Spectrophotometer by the methods recommended by the Standard Observer and Coordinate System of the International Commission on Illumination as fully set forth in the Handbook of Colorimetry published by The Technology Press, Massachusetts Institute of Technology in 1936. Dominate wavelength and purity may be computed from chromaticity coordinates. Dominate wavelength of the color is the wavelength of the part of the spectrum required to be mixed with some fixed light, like daylight, to produce the color. Purity is the ratio of the amount of the spectrum component in this mixture to the sum of the spectrum and the daylight components.

EXAMPLE I

A series of knitted samples were prepared from fibers obtained by wet spinning a blend of a copolymer containing 94 percent by weight of acrylonitrile and six percent of vinyl acetate and a second copolymer containing 50 percent acrylonitrile by weight and 50 percent of 2-methyl-5-vinylpyridine, the blend being so proportioned that six percent by weight of the total blend was 2-methyl-5-vinylpyridine. Samples of these knittings were treated at 200° F. for 30 minutes with aqueous sulphuric acid solutions varying from 0.025 to 0.4 percent concentration. Thirty parts of acid solution were used for one part of knitted material treated. The knitted samples were thereafter removed from the acid treating solutions and immediately immersed in the second treating or bleaching solutions consisting of aqueous solutions of sodium chlorite containing 6.0 percent sodium chlorite based on the weight of the knitted material treated at 150° F. for 45 minutes. The knitted samples were thereafter washed, dried, and submitted for tests of their whiteness. A control knitted sample of the same fibers was subjected to only the bleaching step in 6.0 percent sodium chlorite at 150° F. for 45 minutes and was likewise tested for whiteness. The results of the control and acid-treated and then bleached samples expressed as brightness, purity, and dominant wavelength are set out in Table I below:

Table I

| Sample | Percent Conc. of Acid Sol'n. | Brightness | Purity | Dominant Wavelength (mμ) |
|---|---|---|---|---|
| Control | 0.0 | 74.0 | 9.0 | 575 |
| A | 0.025 | 77.0 | 8.8 | 575 |
| B | 0.05 | 79.9 | 8.6 | 574 |
| C | 0.10 | 83.2 | 5.2 | 573 |
| D | 0.20 | 83.8 | 4.7 | 572 |
| E | 0.40 | 83.0 | 4.2 | 572 |

EXAMPLE II

The same knitted samples which had been subjected to the various levels of acid treatment and bleaching in Example I were subjected to a light sensitivity test for 10 hours in sunlight under glass in accordance with the method for sunlight tests specified in Test No. 16B–52 of the American Association of Textile Chemists and Colorists set forth in the A. A. T. C. C. Handbook for 1954, vol. 30. The samples were again examined with the spectrophotometer to determine changes in the brightness, purity, and dominant wavelength values induced by exposure to sunlight. The results are set out in Table II below:

Table II

[After 10 hours in sunlight under glass.]

| Sample | Percent Conc. of Acid Sol'n. | Brightness | Purity | Dominant Wavelength (mμ) |
|---|---|---|---|---|
| Control | 0.0 | 73.0 | 10.5 | 577 |
| A | 0.025 | 77.0 | 10.0 | 576 |
| B | 0.05 | 79.0 | 8.0 | 574 |
| C | 0.10 | 80.9 | 6.6 | 573 |
| D | 0.20 | 81.6 | 6.0 | 573 |
| E | 0.40 | 81.7 | 4.3 | 572 |

The polymeric materials utilized in the process of this invention may be produced by any of the known polymerization procedures, and the filaments, fibers, or yarns may be produced by either the wet, dry, or melt spinning techniques. The polymeric fibers may be bleached in accordance with this invention in the form of continuous filaments, staple fibers, yarns in the skein, or fabrics produced by any of the known spinning and weaving processes.

As many variations within the spirit and scope of my invention will occur to those skilled in the art, it is to be understood that the invention is not limited to the specific embodiments thereof except as set forth in the appended claims.

I claim:

1. A process for bleaching textile materials formed from polymeric compositions comprising in polymerized form at least 80 percent by weight acrylonitrile, up to 18 percent of other mono-olefinic monomers copolymerizable therewith, and from two to ten percent of an N-heterocyclic monomer containing a polymerizable alkenyl group which comprises, immersing said materials in an aqueous solution of a strong mineral acid of from 0.05 to 0.5 percent by weight concentration for from 15 to 40 minutes at a temperature in the range of 185° to 212° F. and thereafter immersing the said materials in an aqueous solution containing from 2.5 to 6.0 percent sodium chlorite, based on the weight of the materials treated, at a temperature in the range of 140° to 180° F. until no further bleaching occurs.

2. A process for bleaching textile materials formed from polymeric compositions comprising in polymerized form at least 80 percent by weight acrylonitrile, up to 18 percent of other mono-olefinic monomers copolymerizable therewith, and from two to ten percent of an N-heterocyclic monomer containing a polymerizable alkenyl group which comprises, immersing said materials in an aqueous solution of sulfuric acid of from 0.05 to 0.5 percent by weight concentration for from 15 to 40 minutes at a temperature in the range of 185° to 212° F. and thereafter immersing the said materials in an aqueous solution containing from 2.5 to 6.0 percent sodium chlorite, based on the weight of the materials treated, at a temperature in the range of 140° to 180° F. until no further bleaching occurs.

3. The process of claim 1 wherein the textile materials are formed from a polymer of at least 80 percent by weight acrylonitrile, up to 18 percent of another mono-olefinic monomer copolymerizable therewith, and from two to ten percent of a vinylpyridine.

4. The process of claim 1 wherein the textile materials are formed from a blend of (A) a polymer containing at least 80 percent by weight acrylonitrile and up to 20 percent of another mono-olefinic monomer copolymerizable therewith and (B) a polymer containing at least 30 percent by weight of a vinylpyridine and up to 70 percent of another mono-olefinic monomer copolymerizable therewith, (A) and (B) being so proportioned as to provide from two to ten percent by weight of the vinylpyridine in polymerized form in the said blend.

5. A process for bleaching textile materials formed from a blend of (A) a polymer containing at least 80 percent by weight acrylonitrile and up to 20 percent of another mono-olefinic monomer copolymerizable therewith and (B) a polymer containing at least 30 percent by weight of a vinylpyridine and up to 70 percent acrylonitrile, (A) and (B) being so proportioned as to provide from two to ten percent by weight of the vinylpyridine in polymerized form in the said blend which comprises, immersing said materials in an aqueous solution of a strong mineral acid of from 0.05 to 0.5 percent by weight concentration for from 15 to 40 minutes at a temperature in the range of 185° to 212° F. and thereafter immersing the said materials in an aqueous solution containing from 2.5 to 6.0 percent sodium chlorite, based on the weight of the materials treated, at a temperature in the range of 140° to 180° F. until no further bleaching occurs.

6. The process of claim 5 wherein the textile materials are formed from a blend of (A) a polymer containing at least 80 percent by weight acrylonitrile and up to 20 percent vinyl acetate and (B) a polymer containing at least 30 percent by weight of a vinylpyridine and up to 70 percent acrylonitrile, (A) and (B) being so proportioned as to provide from two to ten percent by weight of the vinylpyridine in polymerized form in the said blend.

References Cited in the file of this patent

UNITED STATES PATENTS 2,641,524　Chaney _____ June 9, 1953

FOREIGN PATENTS 1,053,260　France _____ Sept. 30, 1953
567,774　Great Britain _____ Mar. 2, 1945

OTHER REFERENCES

Meybeck: Am. Dyestuff Reporter, vol. 41, December 22, 1952, p. 890.

Papers of the Am. Assoc. of Textile Technologists, December 1950, p. 232.